Dec. 23, 1952  W. BOECHER, JR., ET AL  2,623,150
ELECTRICAL RADIANT HEATING PANEL
Filed June 15, 1951  2 SHEETS—SHEET 1
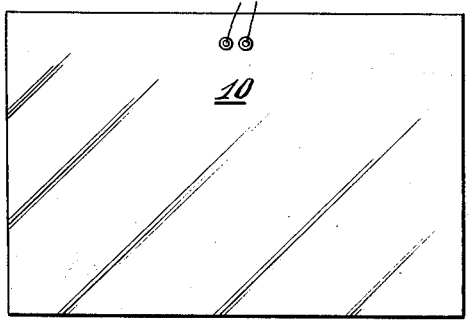
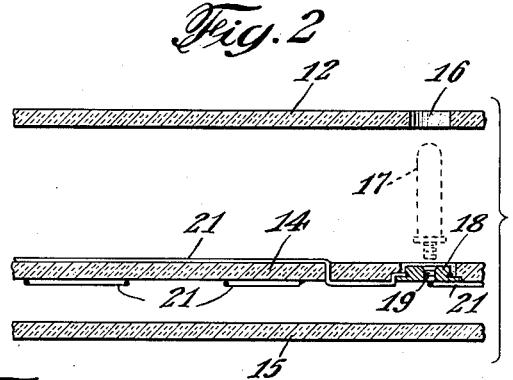
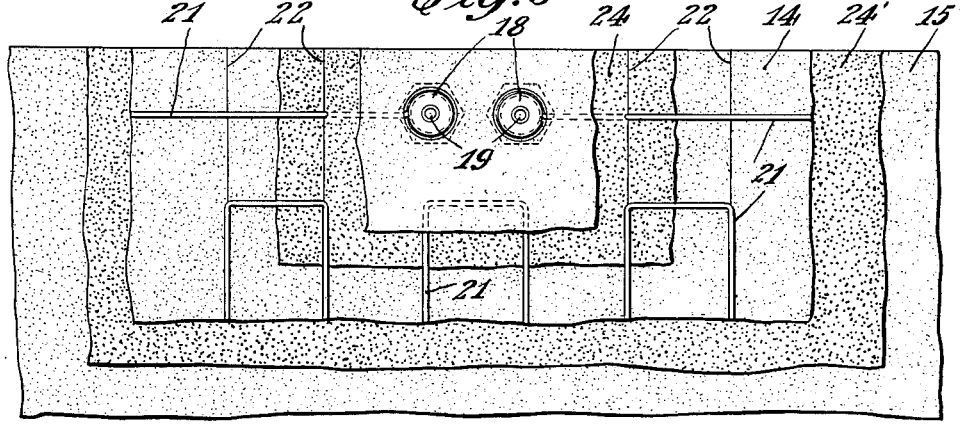
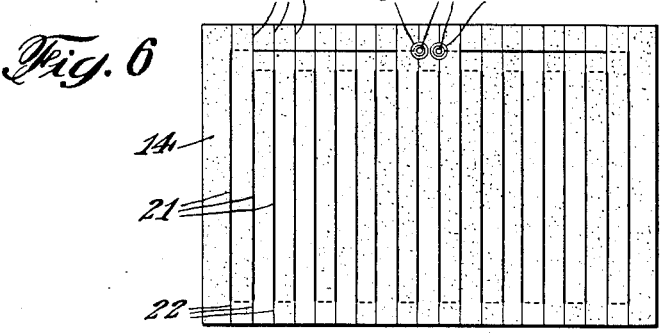
INVENTORS
W. BOECHER JR.
H. J. HARRIS
BY
ATTORNEY Dec. 23, 1952     W. BOECHER, JR., ET AL     2,623,150
ELECTRICAL RADIANT HEATING PANEL
Filed June 15, 1951     2 SHEETS—SHEET 2
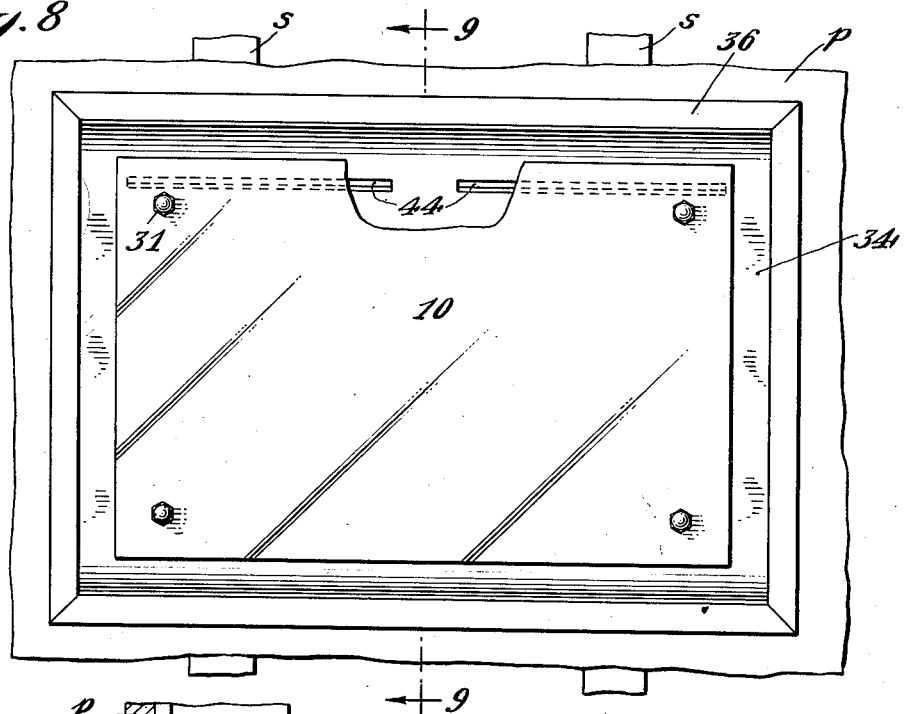
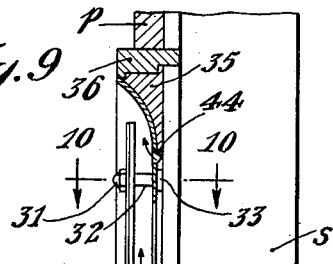
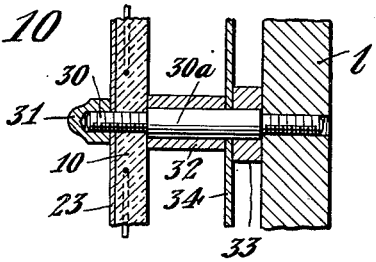
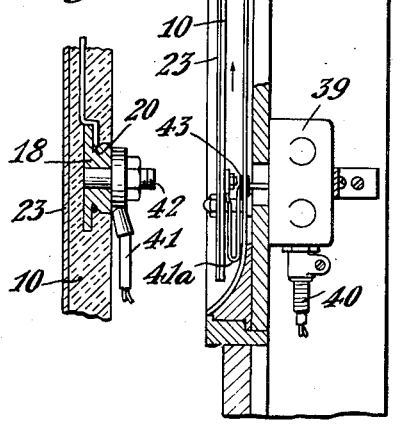
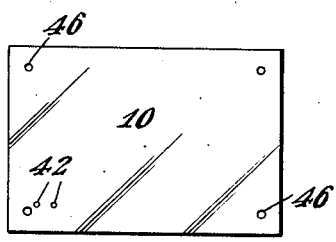
INVENTORS
W. BOECHER JR.
H. J. HARRIS
BY
*J. F. Presson*
ATTORNEY Patented Dec. 23, 1952

2,623,150

UNITED STATES PATENT OFFICE 2,623,150

ELECTRICAL RADIANT HEATING PANEL

Walter Boecher, Jr., Bayside, and Herbert J. Harris, Hartsdale, N. Y., assignors to Thermoray Corporation, New York, N. Y., a corporation of Delaware Application June 15, 1951, Serial No. 231,794

3 Claims. (Cl. 219—19)

This invention relates to improvements in electrical heating assemblies embodying units in the form of radiant heating panels of any desired configuration, and which are adapted to be embodied or embedded in walls of rooms and offices or other space to be heated, or to be suspended or otherwise supported in the area to be heated, or to be incorporated in articles of furniture or other appliances either for home or industrial purposes, for providing controlled radiant heat.

Preferably, the electrical radiant heating panel employed in the heating assembly comprising the invention is composed of a material that is capable of withstanding very high temperatures and which has a very low coefficient of expansion. The panel is nonmetallic except for the electrical heating element embedded therein, and does not deteriorate in service. The body of the panel is principally a homogeneous mixture of a fireproof material impregnated with a suitable resin, with a heating wire or tape embedded and hermetically sealed therein.

An object of the invention is to provide an improved and more efficient heating assembly embodying an electrical heating panel, and having no fire or electrical hazard incident thereto.

An additional object is to provide an electrical heating assembly which captures and utilizes convection heat in addition to the radiant heat produced by the panel thereby to increase the overall heating efficiency of the unit.

The foregoing and other objects and advantages will be apparent from the following detailed description of a preferred embodiment of the invention, taken in connection with the accompanying drawings, in which:

Fig. 1 is a view of a radiant heating panel employed in the assembly of the invention;

Fig. 2 is an exploded view of three sheets of material, together with a resistance wire heating element employed, which form the basic elements of the composite panel of Fig. 1;

Fig. 3 is a plan view of the elements of Fig. 2, with portions thereof broken away to show the three layers or sheets, together with coatings of the impregnating resin which are applied thereto prior to the subsequent curing operation employed to produce the composite panel;

Fig. 4 is an edge view, in elevation, showing one of the completed panels after the assembly and curing operations have been performed;

Fig. 5 shows a completed panel similar to Fig. 4, with an additional surface coating applied thereto;

Fig. 6 shows one method of mounting the resistance wire on the central sheet prior to assembly and curing operations;

Fig. 7 is a detail of an insert employed for receiving external electrical terminal connections;

Fig. 8 is a front view of one of the heating panels and its associated reflector sheet mounted in the wall of a room or office, and in which the assembly captures and utilizes convection heat in addition to the radiant heat produced by the panel;

Fig. 9 is a cross-sectional view taken along the line 9—9 of Fig. 8;

Fig. 10 is a fragmentary view showing certain details of construction, taken along the line 10—10 of Fig. 9;

Fig. 11 is a view of the back of the heating panel per se prior to its installation in the wall of the room or office; and Fig. 12 is a detail of one of the electrical terminal connections employed with the structure of Figs. 8 and 9.

Fig. 1 illustrates an electrical radiant heating panel 10 which is an integral unit produced from the three sheets shown in Fig. 2. Prior to assembly and curing, the panel members comprise two outer sheets 12 and 15, with an intermediate sheet 14. The intermediate sheet has mounted thereon the heating element which, in the form illustrated, is formed from loops of wire 31 of Nichrome or other suitable heating wire material. The resistance wire is mounted on the intermediate sheet 14 in any desired manner, but preferably is secured as shown in Fig. 6 in which slots 22 are cut into edges of the sheet 14, and the wire supported by interweaving the ends of the loops with the tabs formed by the slotted portions. The two ends of the resistance wire are each terminated by means of an insert 18, and the end of the wire is received within a groove 20, shown in detail in Fig. 7. The insert has a threaded portion 19 adapted to receive the screw-threaded portion of an external connecting prong 17 after the three sheets have been assembled and treated in the manner hereinafter set forth. One of the outer sheets 12 has two apertures 16 therein through which the outer terminals 17 are inserted.

Each of the sheets 12, 14 and 15 is composed of short asbestos fibre pulp pressed into sheet form. On one surface each of at least two of the sheets, for example, on the surfaces of sheets 14 and 15, as shown in Fig. 3, is applied a layer or coating 24 or 24′ of a thermosetting phenolformaldehyde resin in solution, after which the three sheets or layers are pressed together in a hot press and are cured at a high temperature of, for example, approximately 400° F. applied while the layers are under a high pressure of, for example, approximately 4000 pounds per square inch. The resulting composite panel is a homogeneous mixture of the asbestos fibre and the resin, and results in an integral panel unit, as indicated in Figs. 1 and 4. The thickness of a panel may be varied depending upon a desired use; a thickness of approximately $\frac{1}{8}$ inch will be found satisfactory for most purposes.

The relative proportions of the asbestos fibre and resin are important and air fairly critical. If the amount of resin relative to the asbestos is too small the resulting product will be flaky and brittle, and also will be somewhat porous and have have a tendency to absorb water or moisture, and the panel will be limited in use to very low temperatures. On the other hand, if too much resin is used this causes the panel to have a tendency to warp in service and also produces an undesirable increase in the coefficient of expansion, and moreover may result in the production of an undesirable odor when the panel is heated.

The thermosetting phenol-formaldehyde resin is applied to the sheets 14 and 15 in a water solution in which the solid phenol powder comprises aproximately 55% by weight and the water of the solution comprises approximately 45% by weight. After the high heat and pressure above referred to have been applied during the curing operation, the water has evaporated so that the resin content in the final product comprises approximately 13% by weight and the asbestos content is approximately 87% by weight.

It is to be understood that each of the percentages given above may vary within reasonable limits, approximately 5% higher or lower, since the asbestos pulp may contain a slight amount of filler material and also since the relative proportions of resin and asbestos may be varied somewhat depending upon the loading per square foot of heating surface area of wattage and voltage for which the panel is to be used. The percentages above given are suitable for panels for a loading per square foot of heating surface area of up to 450 watts and voltages of up to 230 volts and higher. The relative proportions, by volume, are approximately 6½% resin content and approximately 93½% asbestos in the final product, and the percentage of resin may vary, approximately 2½% higher or lower, with a corresponding variation in the asbestos content. The phenol-formaldehyde resin solution may be applied to each of the sheets 12, 14 and 15, instead of only to two of them, and may be applied to either side of the sheets, since in the curing operation the resin solution thoroughly impregnates the asbestos content of all of the sheets and this results in a homogenous composition of asbestos and resin.

The resulting product is extremely hard and inflexible, although prior to or during the curing operation the panel may be given any desired configuration. Both faces and the edge portions of the panel exhibit a hard glaze; the panel is impervious to water and moisture and for all practical purposes is substantially unbreakable and indestructible. The radiant heat produced is uniform per unit area of the heating surface of the panel assuming, of course, and the loops of the heating wire 21 are substantially uniformly spaced. The resistance wire adjacent to the edge portions of the panel is spaced from these portions a distance such that the edge portions do not become heated to an appreciable extent, and because of the even distribution of the heat produced by the area of the panel overlying the resistance wire element, a panel having a loading capacity as high as the order of 175 watts per square foot of heating area may safely be provided with a wooden frame or be placed in an article of furniture or other apparatus without any danger of overheating the adjoining portions of combustible material. Also, due to the uniform distribution of heat produced by the composition of the panel, no unit area of the panel will become appreciably hotter than the remaining unit areas, and no area will become overheated or result in burns when touched by anyone, and also prevents any fire hazard from being present.

As shown in Fig. 5, the outer or upper surface of the composite panel may have applied thereto a coating 23 of any suitable finish or composition, such as a thin coating of a melamine resin, which is a derivative of calcium cyanamide, is desirable since when combined with formaldehyde it is a thermosetting plastic and offers high resistance to burning, heat, water, alcohol, and general everyday use. When the panel is to be mounted in the wall of an office or room, the coating 23 may comprise enamel which is baked on, or any other suitable coating for decorative or utility purposes.

When the heating panel is mounted in a wall or suspended from the ceiling of a room or other space to be heated, it will usually have a loading capacity higher than 175 watts per square foot of heating area, and safely may be worked at capacities up to the order of 450 watts per square foot of heating area of the panel.

The insert 18 is pressed into an opening in the center sheet 14 prior to the curing operation, and each end of the resistance wire is formed around and fastened in the groove 20. During the curing operation the asbestos and resin are pressed and solidified around the insert, and thus there is provided a good permanent electrical connection between the resistance wire and the insert which can not become loose and which is hermetically sealed and thus does not oxidize or otherwise corrode during the life of the heating panel. As will be seen from Fig. 2, the upper side of the insert 18 when first inserted is slightly below the surface of the middle sheet 14 so that as this sheet is compressed during the curing operation, the upper face of the insert will lie against the adjoining surface of the sheet 12, and the material will be pressed and solidified around the insert, leaving only the opening 16 through which the external terminals 17 are inserted after the curing operation.

A thermosetting urea-formaldehyde resin may be employed as the impregnant, but it is not as resistant to heat as the phenolformaldehyde resin and hence is not so suitable for high wattage panels. The phenol resin is preferred since it produces a composition that is suitable for all uses within a wide range of loading values, and thus the composition of the panels may be standardized for a large variety of purposes.

Fig. 8 shows the heating panel and associated elements mounted in the wall of a room, and which is constructed to provide a more efficient heating unit of this type. As seen in Figs. 8, 9 and 10, the heating panel 10 and an associated heat reflecting sheet 34 are mounted by means of threaded bolts or studs 30 which are received within and supported by the lath or other wall structure $l$ secured to building studs $s$. The element 10 at its front surface is secured to four of these studs by means of ornamental nuts 31, and the panel is positioned in proper spaced relation at the rear by means of sleeves or spacers 32, seen in detail in Fig. 10. The spacers 32, in combination with spacers 33, position the heat reflecting sheet 34 of aluminum or other suitable material in proper spaced relation. As shown in Fig. 9, the reflector sheet 34 reflects the heat outwardly and around the entire peripheral portion of the panel 10, and the top and bottom edges of the panel are spaced from the curved portions of the reflector 34 so that circulation of the cooler air entering at the bottom of the unit and passing between the reflector and the rear surface of the heating panel, in the manner indicated by the arrows in Fig. 9, will pass out around the upper edge portions of the panel, and thus produce convection currents for utilizing more efficiently the heat generated by the panel. The upper and lower portions of the reflector 34 are curved or tapered to prevent the accumulation of dust or dirt at these portions.

There is also some heat present between the reflector 34 and the lath structure $l$ and studs $s$ of the wall, this heat being transmitted to the wall structure usually from an adjoining room. In order to utilize this extra heat, the reflector 34 has louvres 44, Figs. 8 and 9, formed therein near the upper edge of the heating panel 10, and by convection this heat will flow out through the louvres, as indicated by the curved arrow in Fig. 9, and be reflected out into the room, thereby adding substantially to the efficiency of the unit and also preventing the formation of heat pockets behind the reflector. The curved portions of the reflector 34 may be blocked out by pieces 35 of wood or other suitable material and a molding 36, which may also comprise wood or any other suitable material, provides a pleasing terminating margin or frame around the heater. The molding may pass through the plaster $p$ or wall board which forms the inner wall of the room, or it may be mounted on the surface of the wall, as desired.

The terminals of the resistance wire unit in the panel 10 of the unit of Figs. 8 and 9 preferably comprise the inserts 18, shown in detail in Fig. 12, and these inserts either may have integral therewith, or be threaded to receive, short threaded studs 42 to which the lead-in wires of the two conductor cable 41 may be secured, preferably by terminal lugs as shown. The cable 41 is formed into a loop 41a, and passes through an insulating bushing 43 in reflector 34, and thence through an opening in the lath structure $l$ into an outlet box 39 which receives the flexible conduit or cable 40 that leads to a switch or thermostat for controlling the current supplied to the heating panel. As indicated in Fig. 12, the heating panel may have a coating 23 of enamel or other material for decorative purposes.

Fig. 11 shows the rear face of the panel 10 prior to mounting the same in the wall unit. The panel is provided with four holes 46 for receiving the threaded studs 30, and also contains the terminal studs 42. By means of the loop 41a of the supply conductors 41, the panel may be electrically connected prior to mounting the same in its position, and similarly may be disconnected and removed therefrom whenever desired.

For brevity in the specification and claims, the term "panel" is employed in a generic sense, wherever applicable, to define the general type of heating unit disclosed herein, and irrespective of its geometrical form, since whether the panel has a flat, curved or other surface configuration and a rectangular, curved or other peripheral outline will depend upon the particular application or the apparatus in which it is used.

It is to be understood that the number of asbestos fibre sheets used in assembling the panel may differ and that the type of heating element and the manner in which it is secured may be varied, and that other changes and modifications in the structures disclosed may be effected, within the scope of the appended claims.

What is claimed is:

1. An electrical heating assembly for installation in the wall of a room, cabinet or other structure for effecting space heating, comprising an electrical radiant heating panel, a sheet of heat-reflecting material positioned behind and spaced from the rear surface of said panel, said reflecting sheet and said panel being constructed to provide openings adjacent to the bottom and top portions of the panel whereby air will rise and pass between the panel and reffecting sheet and be deflected outwardly to produce convection currents of heated air, said reflecting sheet having an opening therein adjacent to the upper portion of the heating panel whereby heated air behind the reflecting sheet will rise and pass through said opening and be deflected outwardly to produce additional convection currents of heated air and also prevent the formation of a heat pocket behind the reflecting sheet.

2. An electrical heating assembly according to claim 1, in which tapered or curved surfaces are embodied in or adjacent to the top and bottom portions of the reflecting sheet to prevent accumulation of dust and dirt carried by said convection currents of heated air.

3. An electrical heating assembly according to claim 1, in which said opening in the reflecting sheet comprises a louver for directing upwardly ond outwardly the heated air behind the reflecting sheet.

WALTER BOECHER, Jr.
HERBERT J. HARRIS.

REFERENCES CITED

The following references are of record in the file of this patent:

UNITED STATES PATENTS

| Number | Name | Date |
|---|---|---|
| 941,605 | Baekeland | Nov. 30, 1909 |
| 1,541,336 | Ellis | June 9, 1925 |
| 1,886,880 | Hare | Nov. 8, 1932 |
| 1,891,595 | Grierson | Dec. 20, 1932 |
| 1,960,120 | Mohring | May 22, 1934 |
| 2,084,468 | Wach | June 22, 1937 |
| 2,110,660 | Doczekal | Mar. 8, 1938 |
| 2,241,312 | Luty | May 6, 1941 |
| 2,372,929 | Blessing | Apr. 3, 1946 |
| 2,393,100 | Gallay et al. | Jan. 15, 1946 |
| 2,408,092 | Patterson | Sept. 24, 1946 |
| 2,493,542 | McGraw | Jan. 3, 1950 |
| 2,502,147 | Grothouse | Mar. 28, 1950 |
| 2,521,540 | Richardson | Sept. 5, 1950 |
| 2,544,547 | Vogel | Mar. 6, 1951 |
| 2,576,632 | Myers | Nov. 27, 1951 |

FOREIGN PATENTS

| Number | Country | Date |
|---|---|---|
| 796,138 | France | Jan. 17, 1936 |
| 949,595 | France | Feb. 21, 1949 |